United States Patent [19]
Bras

[11] Patent Number: 5,437,525
[45] Date of Patent: Aug. 1, 1995

[54] ASSEMBLY COMPONENT HAVING A FORCE SENSOR

[76] Inventor: Serge M. Bras, 19, rue du Picuré, 91 330 Yerres, France

[21] Appl. No.: 118,937

[22] Filed: Sep. 9, 1993

[30] Foreign Application Priority Data

Sep. 25, 1992 [FR] France ................. 92 11459

[51] Int. Cl.⁶ ............... F16B 31/02; G01L 5/00
[52] U.S. Cl. ............................. 411/14; 411/9; 73/761; 116/212
[58] Field of Search .............. 411/8, 9, 14; 73/761; 116/212, DIG. 34

[56] References Cited

U.S. PATENT DOCUMENTS

| | | | |
|---|---|---|---|
| 3,718,066 | 2/1973 | Dally | 411/14 |
| 3,788,186 | 1/1974 | Crites | 411/8 |
| 4,294,122 | 10/1981 | Couchman | 73/761 |
| 4,428,240 | 1/1984 | Schoeps | 411/14 X |
| 4,760,740 | 8/1988 | Meisterling | 411/14 X |

FOREIGN PATENT DOCUMENTS 0381791 8/1990 European Pat. Off. .
1315702 5/1973 United Kingdom .

*Primary Examiner*—Neill R. Wilson

[57] ABSTRACT

A force sensor for measuring tightening tension applied to an assembly component having first and second faces and an axis of symmetry includes a ceramic support layer having a mounting side to be secured to the first face and an exposed side carrying a piezoresistive layer having a resistance that varies in response to its deformation. The force sensor may comprise a central metallic layer and an annular metallic layer joined by the piezoresistive layer or at least two separate sensors having angularly disposed longitudinal axes. A machine for tightening the assembly component includes a motor driven socket for torquing the component in accordance with a sensed tightening tension.

8 Claims, 3 Drawing Sheets

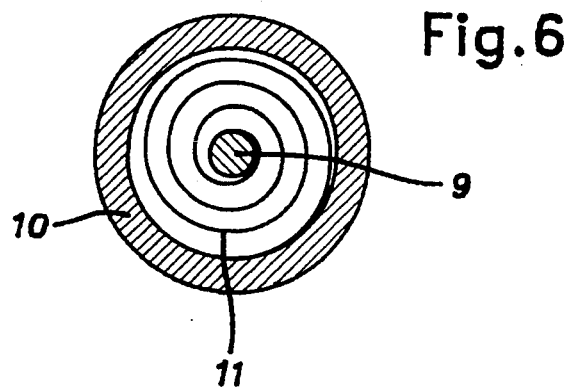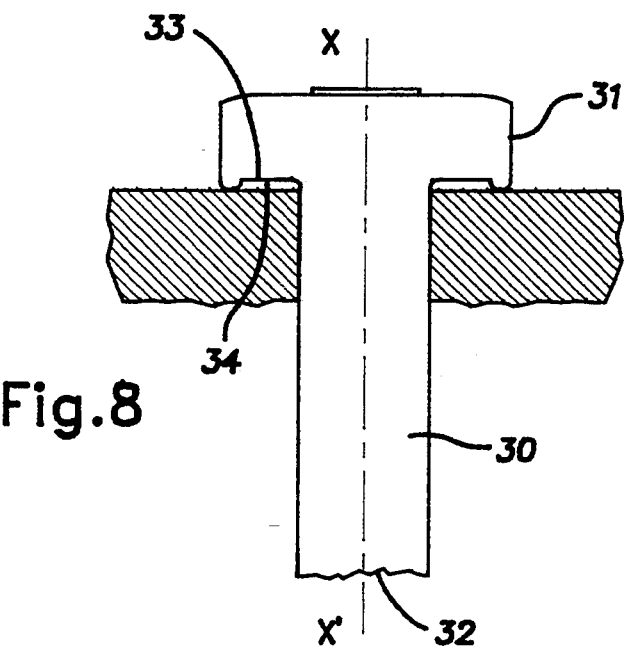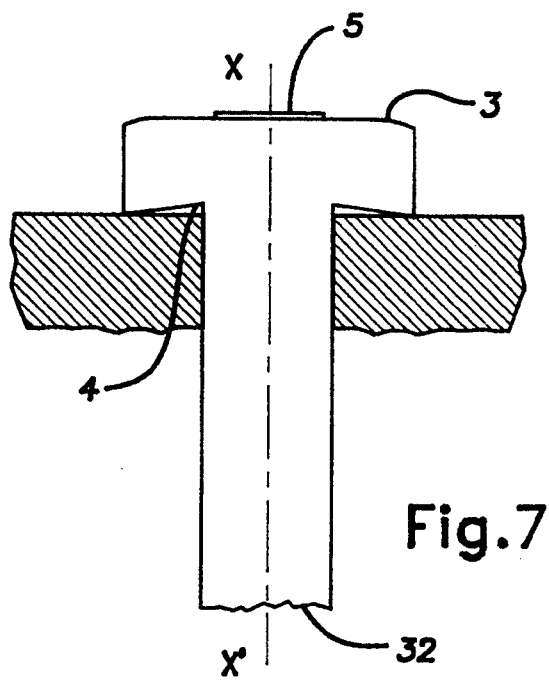

ASSEMBLY COMPONENT HAVING A FORCE SENSOR

BACKGROUND OF THE INVENTION AND RELATED ART

The present invention relates to assembly components such as bolts, rivets, nuts or washers, ties or tensioners notably with a cable, and other similar components which are subjected, when they are used to connect two parts, to a tightening tension. An assembly component of the type to which the invention relates may have a symmetry axis and two opposing faces. The invention also concerns assembly methods and machines, the latter term including the machines for checking the tension in the connections as well as manual tools.

The methods used up till now for measuring the tightening tension of two parts connected by an assembly component use either the measurement of the torque or the measurement of the tightening angle, or the combined measurement of the torque and tightening angle, if applicable together with a stoppage of the tightening at the elastic limit. None of these techniques directly measures the compression force or tightening tension, preferring the secondary parameters from which it is hoped to derive this tightening tension. However, experience shows that the law of correspondence between these parameters and the tightening tension is not reproducible, so that the measurements are vitiated.

In EP-A-381791 and U.S. Pat. No. 4,294,122, an ultrasonic measurement method is proposed for a bolt with a shank surmounted by a head. A piezoelectric sensor attached to the head is able to receive ultrasonic waves reflected by the free end of the shank, which for this purpose must be flat and perpendicular to the symmetry axis. The delay in the wave corresponds to the elongation of the shank. This complicated method is uncertain.

In GB-B-1315702, a method of measurement by positioning an electromagnetic apparatus on the bolt head is described. This method makes it possible to measure the bending deformation of the head. It does not make it possible to measure a radial deformation (perpendicular to the axis) under compression or traction since the apparatus is able to slide in this direction. As the sensor is not attached to the bolt head, during the rotation necessary for the tightening, signal instabilities will appear and thereby prevent feedback control. The smallest amount of dust interposed between the sensor and bolt head modifies the measurement conditions and introduces an error into the result. The method does not work on non-magnetic materials. Moreover, this equipment is bulky and expensive. An apparatus of this type can scarcely be allocated to a single assembly component and be sold with it.

SUMMARY OF THE INVENTION

The invention mitigates these drawbacks by means of an assembly component which, whilst remaining inexpensive, of small size and easy to use, makes it possible, notably by virtue of a machine according to the invention, to measure, accurately and with good reproducibility, a parameter which is more representative of the actual tightening tension and less subject to deviate from this.

The assembly component according to the invention has two opposing faces, a force sensor being positioned on the first face of the component, preferably having the same symmetry axis as the latter. In the present document symmetry axis is taken to mean also a repeat axis giving the initial conformation once again by means of a rotation by any angle. According to the invention, the sensor is fixed by bonding or brazing to the first face, and stable support means for the component are provided on the second face. When for example tightening takes place, the first face of the component deforms, in a clearly reproducible manner, as a function of the tension, for example the tightening tension, so that the sensor fixed thereto deforms in bending, but also, depending on its position, in compression or radial traction, i.e. perpendicularly to any symmetry axis thus providing a truly representative indication of the tightening tension.

As support means, at least three rounded projections can be provided on the second face of the piece. For this purpose it is also possible to provide a rib, preferably annular, if necessary subdivided into several arcs. This rib provides a well defined point of support for the pieces to be tightened, with respect to the axis, and thus guarantees the reproducibility of the results obtained.

But the support means can also be formed by the fact that the second face is rectified or concave ground or by the fact that it is inclined at least partly from the outside towards the symmetry axis in the direction of the first face by at least 3° so as to create a cone locking effect, when the component bears, through this second face, on a piece to be fixed.

Preferably the force sensor consists of a ceramic support on one of the faces of which are deposited a central metallic layer and an annular metallic layer, joined to each other by a layer sensitive to deformation and electrically conductive, notably a piezoresistive layer. In this way an electrical signal is obtained which can easily be processed and transformed into a signal representing the tightening tension. But the sensor may also with advantage be a piezoelectric sensor consisting, for example, of a disk of piezoelectric material (barium titanate, lead zirconate, quartz, etc) metallised on both faces in order to form electrical contacts.

Independently the invention relates to an assembly component having two faces, a force sensor being positioned on the first face of the component, characterised in that the force sensor is made from ceramic, on one face of which are deposited a central metallic layer and an annular metallic layer, joined by a layer sensitive to deformation and electrically conductive, notably a piezoresistive layer.

According to an improvement, making it possible to avoid hysteresis effects and thus guaranteeing good reproducibility, the elasticity modulus of the ceramic making up the support is less than that of the assembly component. When the assembly component deforms, the ceramic support adopts the deformation of the piece instead of imposing a parasitic plastic deformation on it. Thus the invention relates notably to a force sensor where the elasticity modulus of the ceramic is less than 200 GPa, and notably less than 150 GPa and even 100 GPa.

In order to take even better precautions again irregularities in forces on the rib, it is advantageous for the force sensor to be circular. This results in a compensation for differences between forces and a simplification in the upstream chain for calculating and measuring the tightening tension.

But the force sensor may also consist of at least two separate sensors, the longitudinal axes of which form an angle to each other. From signals supplied by each of these separate sensors it is possible, by means of a suitable upstream computation and measurement chain, to measure the tightening tension correctly.

The invention also relates to a method for connecting two parts by means of an assembly component, having a symmetry axis, in which the tightening tension is determined by measuring a deformation by means of a force sensor, characterised in that it consists of fixing the sensor to the assembly component by bonding or brazing and measuring its deformation. By measuring the deformation of the sensor, which adopts the shape of one face of the component rather than the deformation of the component by means of a sensor, account is taken of all the deformations of the sensor and therefore of the component, and notably the radial displacement of the sensor in addition to its bending deformation, so that the measurement is more certain and clearly reproducible.

The invention relates notably to an assembly component having a shank surmounted by a head, in which the first and second faces are provided on the head and in which the free end of the shank is neither strictly perpendicular to the symmetry axis nor strictly centred, as is necessary for an ultrasonic measurement method, but is rough from cropping or stamping.

Finally the invention relates to a machine for connecting two pieces or several pieces by means of an assembly component as mentioned above. This machine comprises a socket intended to fit onto the assembly component and provided with two first electrical contacts which are disposed so as to come into contact respectively with the central metallic layer and the annular metallic layer and between which is connected a measuring chain giving a signal as a function of the deformation of the sensor, under the effect of the tightening tension to which the two pieces are connected.

According to one embodiment of very great interest with regard to a screwed assembly, the computing and measuring chain includes a torque sensing circuit, intended to correct the signal of the parasitic signal induced by the torque applied by a wrench to the assembly component, during the connecting of the two pieces. It is found, in fact, unexpectedly, that the torque applied by a wrench gives a parasitic signal on the machine which it is necessary to eliminate.

In order to forestall the influence of the contact resistances, a current source is provided, connected between the central metallic layer and the annular metallic layer, by two second contacts other than the first contacts.

The measuring chain may include a control circuit for the wrench interrupting the rotation of the latter when the desired tension (for example tightening tension) is reached. Because of this, it is now possible to tighten bolts, rivets, nuts or the like, with a prescribed tightening tension, in a clearly reproducible manner, or tighten tensioners or ties.

It is far preferable to bond the sensor to the face of the assembly component, but it is also possible to achieve this by deposition. A manufacturing process for a sensor according to the invention consists first of all of screen printing the contacts onto the substrate, for example with a silver/palladium paste, drying in an oven and then baking at approximately 850° C. for approximately 10 minutes. Once the substrates have cooled, the resistive part of the sensor is screen printed and is then dried and baked at 850° C. for approximately 10 minutes.

BRIEF DESCRIPTION OF THE DRAWINGS

In the accompanying drawing, given solely by way of example:

FIG. 6 is a plan view of a variant force sensor.

FIGS. 7 and 8 are diagrams of two assembly components according to the invention.

DESCRIPTION OF THE PREFERRED EMBODIMENTS

Figure 1:
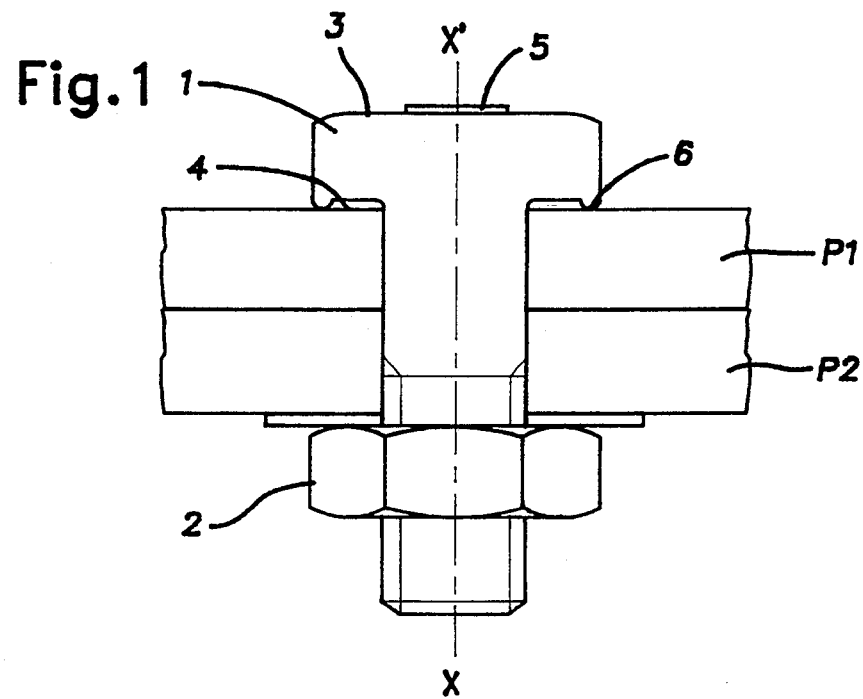
FIG. 1 is a view in elevation of an assembly using the assembly component according to the invention.

In FIG. 1, two pieces P1, P2 (or two parts of the same piece) with parallel faces are gripped between a bolt 1 and a nut 2 with a common symmetry axis X, X'. The bolt is made from Aubert & Duval V300 steel comprising, by weight, 0.45% Co, 1.48% Si, 0.68% Mn, 0.65% Cr and 0.24% Mo, the remainder being iron. This treated steel has a strength of 1800 N/mm$^2$ and an elasticity modulus of 210 GPa. The head of the bolt has a top face 3 and bottom face 4 which are substantially perpendicular to the axis X, X' and opposite each other. A force sensor 5, symmetrical in shape, is bonded to the face 3 and is symmetrical with respect to the axis X, X'. The adhesive, at least one micron thick, is an epoxy adhesive supplied by Epotechny, 10 impasse Latécoère, 78140 Vélizy, under the name EPO-TEK 350 NO. A rounded annular rib 6 is provided on the face 4.

Figure 2:
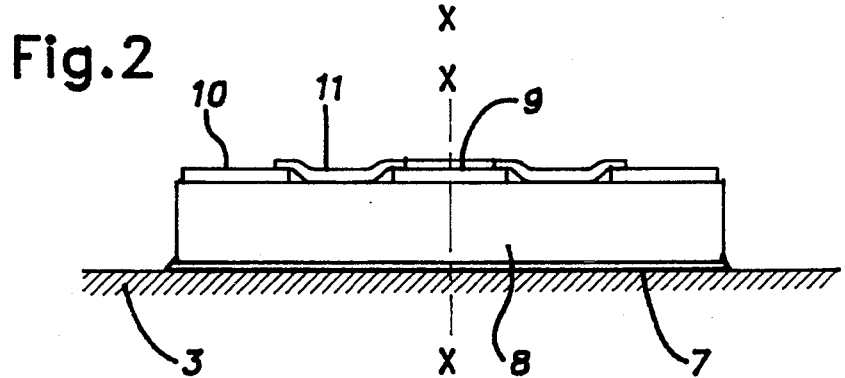
FIG. 2 is a view in cross section of a force sensor bonded onto an assembly component according to the invention.

FIG. 2 is a more detailed view of the force sensor 5. It is bonded to the face 3 by a layer 7 of adhesive and consists of a ceramic support 8, with an elasticity modulus of 125 GPa. On the face of the support 8 opposite to the one through which it is in contact with the layer of adhesive, a central metallic layer 9 and an annular metallic layer 10, joined together by a piezoresistive layer 11, are formed by screen printing. The force sensor is circular in shape. In an inexpensive variant, the contacts consist of a central tablet and an annular part connected together by a large number of spokes.

Figure 3:
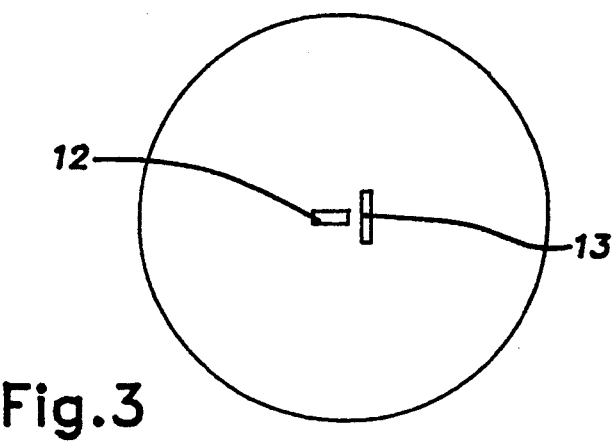
FIG. 3 is a plan view of a variant force sensor.

In FIG. 3, the force sensor is also circular in shape and, on one of its faces, two separate sensors 12, 13 are provided, the longitudinal axes of which form a right angle to each other. The sensors 12 and 13 have a length which is small compared with the radii of the bolt head, being for example less than one tenth of this.

In FIG. 6, the piezoresistive layer 11 of the force sensor 5 has the shape of a spiral rotating clockwise starting from the centre. This shape makes it possible to correct, at least partially, the effect of the parasitic signal induced by the wrench screwing in a clockwise direction.

Figure 4:
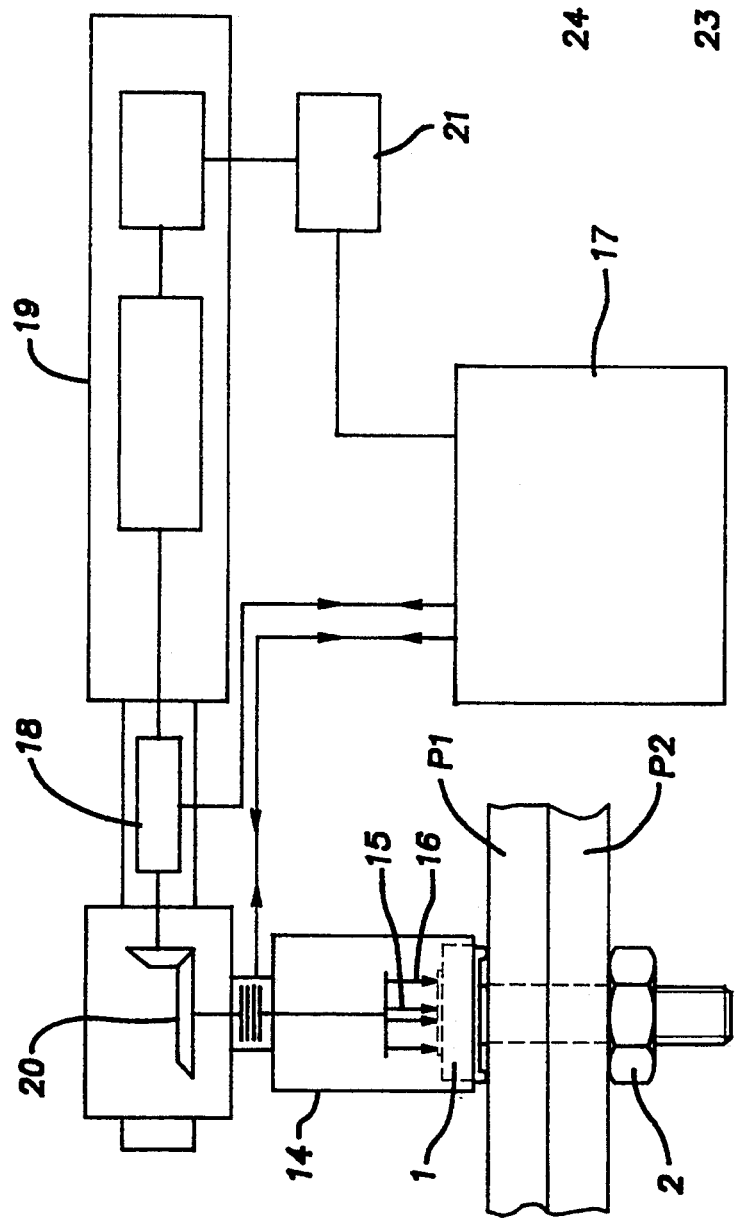
FIG. 4 is a diagram of a machine according to the invention.

The machine shown diagrammatically in FIG. 4 includes a socket 14 intended to fit over the assembly component 1 and provided with two first electrical contacts 15, 16, which are disposed so as to come into contact respectively with the central metallic layer 9 and annular metallic layer 10. Between these contacts a calculating and measuring chain 17 is connected, giving a signal as a function of the deformation of the force sensor under the effect of the tightening tension to which the two pieces P1, P2 are subjected.

Between the chain 17 and the contacts 15, 16, a circuit 18 is mounted with a torque sensor intended to correct the signal supplied to the measuring chain 17 for the parasitic signal induced by the torque applied by a wrench to the assembly component, when the two pieces P1, P2 are connected. The wrench may be the socket 14 or a separate wrench applied to the nut 2, the holding and measuring socket 14 always however being present.

A geared motor 19 controls the socket 14, through bevel gears 20, so as to rotate the bolt 1. The measuring chain 17 also includes a control circuit 21, which controls the geared motor 19 so as to interrupt the rotation of the socket 14 serving as a wrench when the desired tightening tension is achieved. The tightening tension measured may be transmitted to the operator through an audible, visual or other interface.

Figure 5:
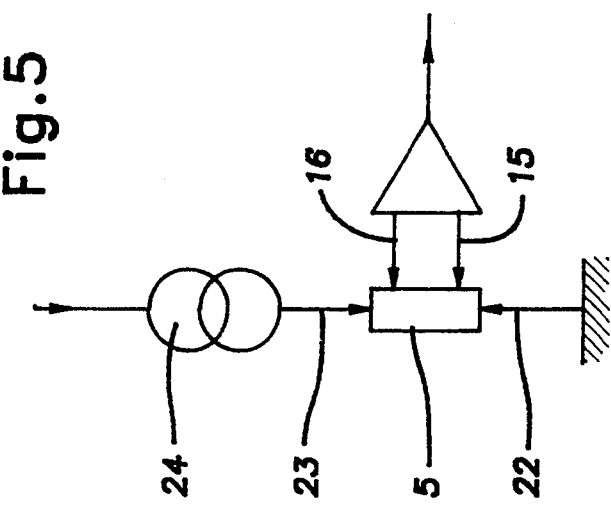
FIG. 5 is an electrical diagram illustrating a variant of a machine according to the invention.

In FIG. 5, the force sensor is still connected to the chain 17 through the contacts 15 and 16, but is also connected, by contacts 22 and 23, on the one hand to a regulated current source 24 and on the other hand to the zero potential of the measuring system. Because of this, any fortuitous contact resistance at 22, 23 has no influence on the signal provided by the force sensor to the chain 17.

In FIG. 7, the support means are formed by the fact that the second face 4 slopes by 1° from the outside towards the axis XX', moving closer to the first face 3 on which the sensor 5 is located. In the figure the slope has been greatly exaggerated.

The assembly shown in FIG. 8 comprises a shank 30 surmounted by a head 31. The free end 32 of the shank is not plane, but is rough from cropping. An annular force sensor 34 is bonded to the bottom face 33 of the head 31. When the bolt is tightened, this sensor 34 deforms in traction in the radial direction.

I claim:

1. An assembly component for use in connecting together two or more parts, said component having first and second faces, a sensor means for measuring in a reproducible manner variable tightening tensions or compression forces applied to said assembly component, said sensor means being positioned on the first face of the component and fixed by bonding or brazing to the first face and stable support means for the component provided on the second face.

2. The component according to claim 1, characterised in that the support means are formed by at least three projections provided on the second face, by a rib provided on the second face, by the fact that the second face is concave-shaped or by the fact that it is inclined at least partially from the outside towards an symmetry axis in the direction of the first face by at least 3°.

3. The component according to claim 2 having a symmetry axis and comprising a shank with free end and surmounted by a head, wherein the two faces are provided on the head and the free end of the shank is not strictly perpendicular to the axis.

4. An assembly component for use in connecting together two or more parts, said component having a symmetry axis and two faces, a force sensor means for measuring in a reproducible manner variable tightening tensions or compression forces applied to said assembly component, said sensor means being positioned on the first face of the component and comprising a ceramic support having first and second sides, said first side of the ceramic support being adapted to be mounted to the first face of the component, said second side of the support having deposited thereon a central metallic layer and an annular metallic layer, joined to each other by a conductive layer having an electrical conductivity that changes in response to its deformation upon application of tightening tensions or compression forces to said assembly component.

5. The component according to claim 4, wherein the ceramic support has an elasticity modulus less than that of the assembly component.

6. The component according to claim 5, wherein the elasticity modulus of the ceramic is less than 200 GPa.

7. The component according to claim 4, wherein the sensor means includes a spiral-shaped piezoresistive layer.

8. The component according to claim 1, wherein the force sensor means consists of at least two separate sensors with longitudinal axes that form an angle to each other.

* * * * *